(12) United States Patent
Cormode et al.

(10) Patent No.: US 8,391,164 B2
(45) Date of Patent: Mar. 5, 2013

(54) COMPUTING TIME-DECAYED AGGREGATES IN DATA STREAMS

(75) Inventors: Graham Cormode, Summit, NJ (US); Philip Korn, New York, NY (US); Srikanta Tirthapura, Ames, IA (US)

(73) Assignees: AT&T Intellectual Property I, L.P., Atlanta, GA (US); Iowa State University Research Foundation, Inc., Ames, IA (US)

( * ) Notice: Subject to any disclaimer, the term of this patent is extended or adjusted under 35 U.S.C. 154(b) by 1464 days.

(21) Appl. No.: 12/006,338

(22) Filed: Jan. 2, 2008

(65) Prior Publication Data

US 2009/0172059 A1    Jul. 2, 2009

(51) Int. Cl.
    *G06F 17/00* (2006.01)
(52) U.S. Cl. ........................................ 370/250; 370/252
(58) Field of Classification Search .................. 370/250, 370/252, 236.2, 394
    See application file for complete search history.

(56) References Cited

U.S. PATENT DOCUMENTS

| | | | |
|---|---|---|---|
| 7,246,227 B2 | 7/2007 | Kissel | |
| 7,283,566 B2 | 10/2007 | Siemens et al. | |
| 7,302,480 B2 | 11/2007 | Lahtinen | |
| 2006/0083233 A1* | 4/2006 | Nishibayashi et al. | 370/389 |
| 2007/0110046 A1* | 5/2007 | Farrell et al. | 370/389 |
| 2008/0043619 A1* | 2/2008 | Sammour et al. | 370/231 |
| 2008/0222415 A1* | 9/2008 | Munger et al. | 713/168 |

OTHER PUBLICATIONS

N. Shrivastava, et al., "Medians and Beyond: New Aggregation Techniques for Sensor Networks", ACM SenSys '04, Nov. 3-5, 2004, Baltimore, MD. pp. 239-249.

G. Cormode, et al., "An Improved Data Stream Summary: The Count-Min Sketch and its Applications", J. Algorithms 55(1): 58-75, 2005.

G. Cormode, et al., "Time-Decaying Aggregates in Out-of-order Streams", DIMACS Technical Report 2007—Jul. 10, 2007.

\* cited by examiner

*Primary Examiner* — Brian D Nguyen

(57) ABSTRACT

Aggregates are calculated from a data stream in which data is sent in a sequence of tuples, in which each tuple comprises an item identifier and a timestamp indicating when the tuple was transmitted. The tuples may arrive out-of-order, that is, the sequence in which the tuples arrive are not necessarily in the sequence of their corresponding timestamps. In calculating aggregates, more recent data may be given more weight by multiplying each tuple by a decay function which is a function of the timestamp associated with the tuple and the current time. The tuples are recorded in a quantile-digest data structure. Aggregates are calculated from the data stored in the quantile-digest data structure.

25 Claims, 9 Drawing Sheets

COMPUTING TIME-DECAYED AGGREGATES IN DATA STREAMS

STATEMENT REGARDING FEDERALLY SPONSORED RESEARCH OR DEVELOPMENT

This invention was made with government support under Contract No. CNS0520102 from the National Science Foundation. The United States Government has certain rights in the invention.

CROSS-REFERENCE TO RELATED APPLICATION

This application is related to U.S. patent application Ser. No. 12/006,333, filed Jan. 2, 2008, and subsequently published as U.S. Patent Application Publication No. 2009/0172058, entitled Computing Time-Decayed Aggregates under a Smooth Decay Function, which is being filed concurrently herewith and which is herein incorporated by reference in its entirety.

BACKGROUND OF THE INVENTION

The present invention relates generally to data processing, and more particularly to computing time-decayed aggregates in data streams.

Statistical analysis of data is a core process for characterizing and controlling systems. In many applications, large volumes of data are generated from multiple data sources as multiple data streams, in which data is updated frequently. In some instances, the updates may be considered to be continuous, or near-continuous. In an industrial application, for example, sensors may provide real-time measurements of process variables such as position, velocity, acceleration, temperature, pressure, humidity, and chemical concentration to a monitoring and control station. In a financial application, multiple order-entry systems may provide near real-time updates of stock prices to a central transaction system. A major application is transport of data across a packet data network. E-mail, instant messaging, file transfers, streaming audio, and streaming video applications may generate large streams of data from multiple data sources, such as personal computers and web servers, across a packet data network. Network operations, administration, maintenance, and provisioning (OAM&P) require accurate characterization of data streams. Network performance and reliability, for example, depend on the traffic capacity of the network infrastructure equipment (such as routers, switches, and servers), on the traffic capacity of the communication links between network infrastructure equipment, and on the network architecture.

In some applications, data may be captured, statically stored in a database, and post-processed. In other applications, real-time, or near real-time, analysis is required. For example, if data traffic to a specific router is becoming excessive, new data traffic may be dynamically re-directed to another router. As another example, if an excessive number of users are accessing a web server, new users may be dynamically re-directed to a mirror server. In applications such as real-time control, the most recent data may have the highest relevancy. Particularly when the data streams are large, selectively filtering the most recent data for analysis reduces the required computational resources, such as processor speed and memory capacity, and computational time.

Commonly, what constitutes the most recent data, for example, is determined by the arrival time of the data at the network element (data receiver) which collects the data. The underlying assumption is that the time order in which the data arrives at the data receiver is the same time order in which the data sources generated the data. In applications such as transport of data across a packet data network, however, this assumption may not hold. For example, if data is generated by multiple sensors and the data is transported across a packet data network to a single monitoring and control station, the data from each sensor may be transported across different routes. The delay across one route may differ from the delay across a different route. In general, the delay across a specific route may be a function of overall data traffic across that route. If the overall data traffic is variable, the delay may also be variable. Consider the example in which data from sensor 1 is generated before data from sensor 2. At a particular instance, the data from sensor 1 may arrive at the monitoring and control station ahead of the data from sensor 2. At a later instance, however, under a different set of network conditions, the data from sensor 2 may arrive ahead of the data from sensor 1.

Even if the data is generated by a single data source, the data may arrive at a data receiver out-of-order. In a packet data network, user data may be segmented into multiple data packets. Depending on the configuration of the packet data network, there may be multiple routes between the data source and the data receiver. As discussed above, the delay across one route may differ from the delay across a second route. Consider the example in which data packet 1 is generated before data packet 2. If the two data packets are transmitted across different routes, and if the delay across the route for data packet 1 sufficiently exceeds the delay across the route for data packet 2, then data packet 2 may arrive before data packet 1.

Statistical properties of data streams are characterized by aggregate statistical values (which are referred to herein simply as aggregates), such as the average number of packets per unit time or the quantile distribution of the number of packets per unit time. Calculating aggregates from large volume unordered data streams may be computationally intensive. Herein, an unordered stream is a data stream in which the age of the data and the time order of the data are not taken into account. If the age (recency) of the data and the time order of the data are of significance, then, in general, calculating aggregates requires additional computational resources and additional computational time. What are needed are method and apparatus for efficiently calculating age-dependent aggregates from large volume data streams in which the data may be received in arbitrary time order.

BRIEF SUMMARY OF THE INVENTION

Data streams arriving at a data receiver may comprise data of different age. In calculating statistical aggregates, more recent data may have more relevance than older data. In an embodiment of the invention, the data stream is comprised of a sequence of tuples, in which each tuple comprises an item identifier and an associated timestamp. The timestamp indicates the time at which the tuple was transmitted by a data source. At the data receiver, a tuple is multiplied by a decay function, which is a function of the current time and the associated timestamp. The decay function gives higher weight to more recent items. The tuples are recorded in a quantile-digest data structure, comprising multiple quantile-digests, which may be compressed to reduce required computer resources, for example, memory and computational time. The quantile-digest data structure accommodates tuples which arrive out-of order, that is, tuples which do not arrive in the same sequence as their timestamps. User-defined aggregate functions may be efficiently calculated with deterministic error bounds.

These and other advantages of the invention will be apparent to those of ordinary skill in the art by reference to the following detailed description and the accompanying drawings.

DETAILED DESCRIPTION

Figure 1:
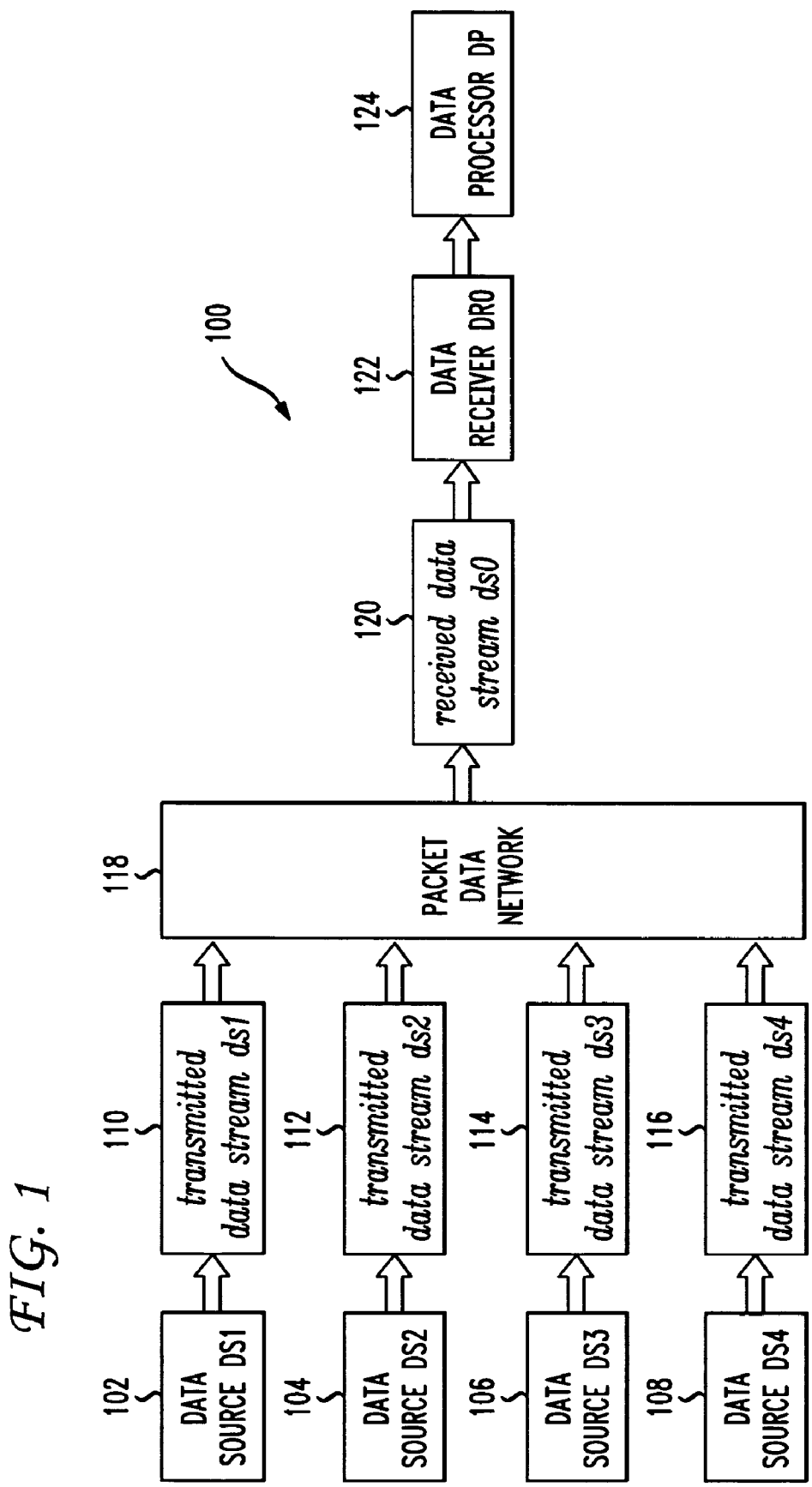
FIG. 1 shows a schematic of a data measurement system in a packet data network.

FIG. 1 shows a high-level schematic of data measurement system 100. In this example, there are four data sources, DS1 102-DS4 108. Each data source generates an independent data stream. The transmitted data streams corresponding to data sources DS1 102-DS4 108 are transmitted data streams ds1 110-ds4 116, respectively. The transmitted data streams ds1 110-ds4 116 are transported across packet data network 118 to a single data receiver DR0 122. In general, there may be multiple data receivers. In general, a data receiver may receive multiple data streams from multiple packet data networks through multiple ports. The multiple received data streams, however, may be viewed as a single virtual received data stream. In the example shown, the transmitted data streams ds1 110-ds4 116 are combined into a single virtual received data stream ds0 120. The received data stream ds0 120 is processed by data processor DP 124. In FIG. 1, data receiver DR0 122 and data processor DP 124 are shown as separate network elements, such as a router and a workstation, respectively. Data receiver DR0 122 and data processor DP 124, however, may also be integrated into a single network element, such as a server.

Herein, a data stream is represented by an unbounded sequence of tuples $e_i = \langle x_i, w_i, t_i \rangle$, where i is a sequential integer index, $x_i$ is the identifier of an item, $w_i$ is an initial weighting factor, and $t_i$ is a timestamp. The index i indicates the arrival order in which a tuple is received at a data receiver. An identifier may be a simple sequence label, such as $data_1$, $data_2$, $data_3$ ..., or $packet_1$, $packet_2$, $packet_3$ .... In general, an identifier is a user-defined designation. An item herein refers to user-defined data, which may include values of multiple parameters. For example, in an industrial application, an item may be the value of a single parameter such as temperature, or an item may be the values of a pair of parameters such as temperature and pressure. In a packet data network, an item may be the single value of the source address, or an item may be the values of the (source address, destination address) pair.

In another example, an item may include the message body in addition to the source and destination addresses. To simplify the terminology herein, an item with the identifier $x_i$ is referred to as item $x_i$. The initial weighting factor $w_i$ modifies the sensitivity of aggregates (see below) to the value of an individual tuple. If the item is a data packet, for example, a weighting factor may be the number of bytes in the data packet. Embodiments may be applied to tuples with arbitrary initial weighting factors $w_i$. To simplify the discussion, in the examples below, the weighting factors are all set equal to 1. One skilled in the art may apply other embodiments to applications in which arbitrary initial weighting factors are associated with each tuple. The timestamp $t_i$ is the time at which the item was generated by a data source, for example, data source DS1 102 in FIG. 1. The value of the timestamp $t_i$ is referenced to the local clock of the data source issuing the timestamp.

As discussed above, data measurement system 100 includes four data sources DS1 102-DS4 108, generating transmitted data streams ds1 110-ds4 116, respectively. Each transmitted data stream may be represented by the tuples $e_{n,i} = \langle x_{n,i}, t_{n,1} \rangle$, where n=1-4 is an index representing the number of the data source. That is, data sources DS1 102-DS4 108 correspond to n=1-4, respectively. In examples discussed below, the data analysis is performed on the combined data on received data stream ds0 120. Therefore, the notation herein is simplified by including the source index n as a value in the identifier $x_i$. The received data stream ds0 120, then, is represented by the tuples $e_i = \langle x_i, t_i \rangle$. Note that multiple items may have the same timestamp $t_i$. In an advantageous embodiment, the clocks of data sources DS1 102-DS4 108 and data receiver DR0 122 are all synchronized. For example, a synchronization scheme such as network time protocol (NTP) may be used. One skilled in the art may apply other embodiments to data measurement systems in which the clocks are not synchronized. For example, the offsets of the clocks may be determined in advance of the data measurements, and appropriate correction factors may be applied.

Herein, a sequence of tuples is in-order if they arrive at a receiver in the same sequence as their timestamps. For example, consider the tuples in the received data stream ds0 120. As the tuples arrive at the data receiver DR0 122, if the timestamp of a tuple is greater than or equal to the timestamp of the previous tuple, then the tuples are in-order. For example, a sequence of three tuples may arrive in-order with timestamps of 1, 2, and 3 ms, respectively. As discussed above, however, depending on network conditions, tuples may arrive out-of-order. For example, a sequence of three tuples may arrive out-of-order with timestamps of 1, 3, and 2 ms, respectively. The current time is designated herein as time t. The reference for the current time is user-definable. For example, the current time t may be the time at which a tuple in the received data stream ds0 120 is received by data receiver DR0 122 (also referred to as observation time). In another example, the current time t may be the time at which a tuple is processed by data processor DP 124 (also known as query time). In general, there may be a delay between the time at which a tuple is received and the time at which a tuple is processed. As discussed below, processing a data stream of tuples includes calculating aggregates. The age of an item in tuple $\langle x_i, t_i \rangle$ is referred to herein as the difference between the current time and the time at which the item was generated by the data source, as specified by the timestamp. Let $a_i$ represent the age of item in tuple $\langle x_i, t_i \rangle$, then $a_i = t - t_i$. To simplify the terminology, an item in tuple $\langle x_i, t_i \rangle$ is referred to as item $\langle x_i, t_i \rangle$. As discussed above, for some applications, recent data is more significant than earlier data. The degree of significance may be varied by applying an age-dependent weighting factor to an item, such that more recent items, which have a lower age, receive higher weighting factors than older items, which have a higher age.

In an embodiment, time-dependent weighting factors may be generated by decay functions. Different decay functions may be chosen to model different applications. Herein, a function g(a) is a decay function if it satisfies the following two properties:

$$g(0)=1 \text{ and } 0 \leq g(a) \leq 1 \text{ for all } a \geq 0, \text{ and}$$

$$g \text{ is monotone decreasing: if } a_1 > a_2, \text{ then } g(a_1) \leq g(a_2).$$

Examples of Decay Functions include the Following:

Sliding Window. The decay function is g(a)=1 for a<W and g(a)=0 for all a≥W. Only items whose age is less than a window size W are considered. Older items are dropped completely.

Exponential Decay. The decay function is g(a)=exp(−λa) where λ is a decay parameter with values λ>0. With this decay function, the time for g to drop by a constant fraction is the same, that is, g(a)/[g(A+a)] for a fixed A is the same for all a.

Polynomial Decay. The decay function is $g(a)=(a+1)^{-\alpha}$, where α is a decay parameter. It may be used in applications in which exponential decay is too fast.

In many applications, the characteristics of individual tuples are not critical. Aggregate statistical values from a large set of tuples are often used to characterize a data stream. For simplicity, aggregate statistical values are referred to herein as aggregates. Common examples of aggregates include averages and medians. Embodiments may be applied to calculate arbitrary aggregates. In general, an aggregate is a user-defined aggregate function. In the discussions below, examples of aggregates are ranges, quantiles, and heavy hitters. A heavy hitter is an item which appears frequently. The criteria for a heavy hitter is user-definable. As discussed above, calculation of time-decayed aggregates of data streams, in which items may arrive out of order, are important for many applications.

Herein, the following terms are defined for a given input data stream $S=\{<x_i, t_i>\}$:

Decayed Weight. The decayed weight of an item at time t is $g(a_i)=g(t-t_i)$

Decayed Count. The decayed count of the stream at time t is $$D(t) = \sum_i g(a_i)$$

Decayed φ-Quantile. The decayed φ-quantile of the data stream is the item q satisfying $$\sum_{i, x_i < q} g(a_i) \leq \phi D \text{ and } \sum_{i, x_i \leq q} g(a_i) > \phi D$$

Decayed φ-Heavy Hitters. The decayed φ-heavy hitters are the set of items {p} satisfying $$\sum_{i, x_i = p} g(a_i) \geq \phi D$$

If there is no time decay [g(a)=1 for all a], the values of the aggregates are independent of the timestamps $t_i$, and, therefore, independent of arrival order. With time decay, the values of the aggregates do depend on the arrival order. Solving for the exact values of the decayed φ-quantile and of the decayed φ-heavy hitters requires considerable computational resources. In embodiments, the following approximate solutions are used to reduce the required computational resources:

Approximate Solution for Decayed φ-Quantile. For 0<ε<φ≤1, the ε-approximate decayed φ-quantile is calculated by calculating an item q satisfying $$(\phi - \epsilon)D \leq \sum_{i, x_i < q} g(a_i) \leq (\phi + \epsilon)D$$

Approximate Solution for Decayed φ-Heavy Hitters. For 0<ε<φ≤1, the ε-approximate decayed φ-heavy hitter is calculated by calculating a set of items {p} satisfying $$\sum_{i, x_i = p} g(a_i) \geq (\phi - \epsilon)D,$$

and omitting no q such that $$\sum_{i, x_i = q} g(a_i) \geq (\phi + \epsilon)D$$

Since the value of the decay function depends on the query time (time at which the value of the aggregate is processed or calculated), the values of the approximate decayed aggregate solutions depend on the query time. Herein, a query is a user-defined operation. For example, a query may be the calculation of an aggregate. As another example, a query may be a search for a particular data value in a set of data. The result of a query is referred to herein as the answer to the query.

An embodiment for calculating time-decayed aggregates of data streams in which items arrive in arbitrary order is described herein for a sliding-window decay function. A data structure is constructed to track the decayed count of items in a sliding window as they arrive in arbitrary order. Given a window size w (specified at query time) and a data stream $S=\{<x_i, t_i>\}$, the function $D_w(t)=|\{i \mid t-t_i<w\}|$ is the decayed count within the window w. To reduce required computational resources, an approximate value of $D_w(t)$ with ε relative error is calculated. Each $t_i$ is represented as an integer in the range [0 . . . W−1], where W is an upper bound on the window size w. For simplicity, W is represented as a power of 2. No generality is lost since W only has to be an upper bound of w.

An advantageous embodiment uses a quantile-digest (q-digest) data structure. Given a parameter 0<ε<1, a q-digest summarizes the frequency distributions $f_i$ of a multiset defined by a stream of N items drawn from the domain [0 . . . W−1]. The q-digest may be used to estimate the rank of an item q, which is defined as the number of items dominated by q, that is, $$r(q) = \sum_{i<q} f_i.$$

The data structure maintains an appropriately defined set of dyadic ranges $\subseteq [0 \ldots W-1]$ and their associated counts. A dyadic range is a range of the form $[i2^j \ldots (i+1)2^j-1]$ for non-negative integers i, j. That is, its length is a multiple of two, and it begins at a multiple of its length. An arbitrary range of integers [a . . . b] may be uniquely partitioned into at most $2 \log_2 (b-a)$ dyadic ranges, with at most 2 dyadic ranges of each length. The q-digest has the following properties:

Each range, count pair (r, c(r)) has $$c(r) \leq \frac{\epsilon N}{\log_2 W},$$

unless r represents a single item.

Given a range r, denote its parent range as par(r), and its left and right child ranges as left(r) and right(r), respectively. For every (r, c(r)) pair, $$c(par(r)) + c(\text{left}(par(r))) + c(\text{right}(par(r))) \geq \frac{\epsilon N}{\log_2 W}.$$

If the range r is present in the data structure, then the range par(r) is also present in the data structure. In general, a q-digest data structure may comprise a set of q-digests.

Given query point $q \in [0 \ldots W-1]$, an estimate of the rank of q, denoted by $\hat{r}(q)$, may be computed as the sum of the counts of all ranges to the left of q, that is, $$\hat{r}(q) = \sum_{(r=[l,h],c(r)),h<q} c(r).$$

The following accuracy guarantee may be shown for the estimate of the rank: $\hat{r}(q) \leq r(q) \leq \hat{r}(q) + \epsilon N$. Similarly, given a query point q, the frequency $f_q$ of item q may be estimated as $\hat{f}_q = \hat{r}(q+1) - \hat{r}(q)$, with the following accuracy guarantee: $f_q - \epsilon N \leq \hat{f}_q \leq f_q + \epsilon N$. The q-digest may be maintained in space $$O\left(\frac{\log W}{\epsilon}\right).$$

For simplicity, herein, log refers to $\log_2$. Updates to a q-digest may be performed in time $O(\log \log W)$, by binary searching the $O(\log W)$ dyadic ranges containing the new item to find the appropriate place to record its count. Queries take $$O\left(\frac{\log W}{\epsilon}\right).$$

The q-digest does not require that all items have unit weight, but can be modified to accept updates with arbitrary (that is, fractional) non-negative weights. Also, multiplying all counts in the data structure by a constant γ gives an accurate summary of the input scaled by γ. The properties of the data structure still hold after these transformations.

Figure 2:
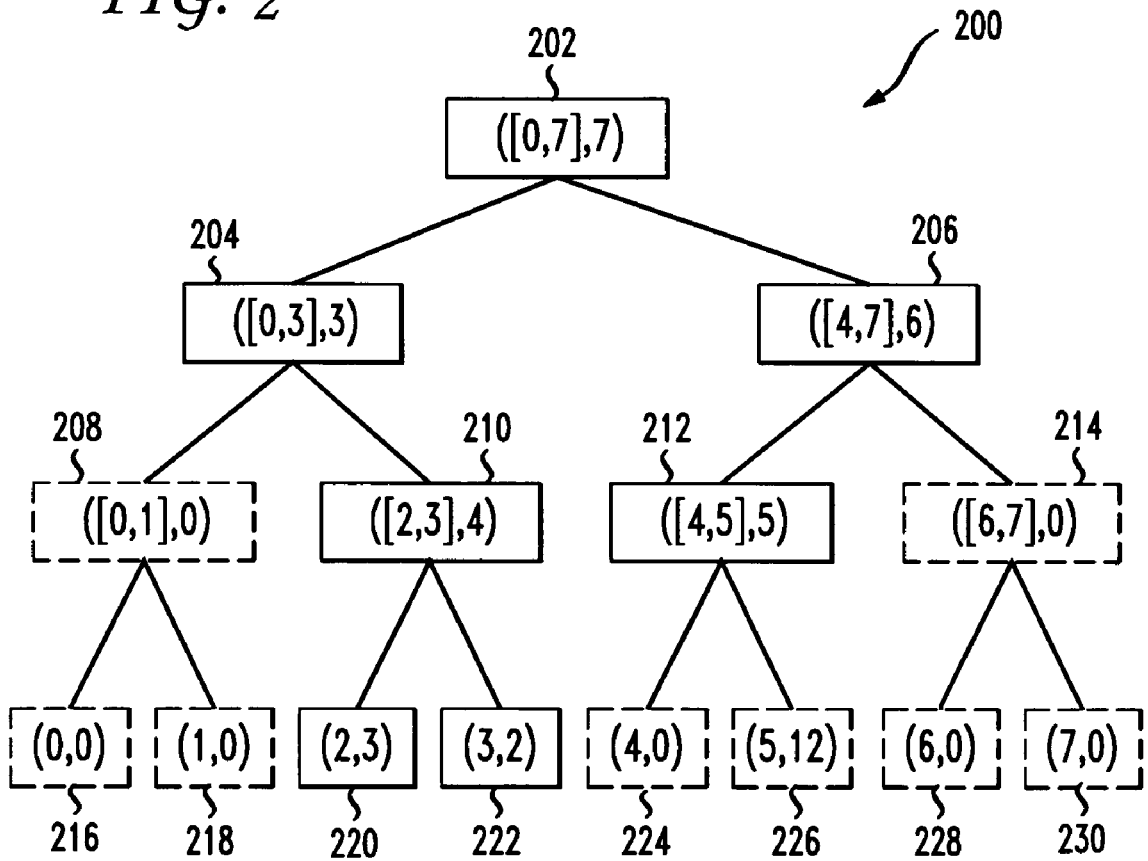
FIG. 2 shows a tree representation of a q-digest data structure.

As an example, FIG. 2 shows a schematic of q-digest 200, which is represented as a binary tree with nodes 202-230. In this example, W=8, and the full set of possible measurement values are the set of 8 integers [0, . . . ,7]. The value of ϵ is ½. A complete set of data would report the counts for each integer value. Defined approximations of aggregates may be calculated from the q-digest. Each node 202-230 is labeled with the (range=r, count=c(r)) pair inside the rectangle. The leaf nodes 216-230 represent the full set of integer outcomes [0, . . . ,7]. Therefore, for leaf nodes, the range is a single integer. For the higher-order nodes, 202-214, the range spans more than one integer and is denoted by the pair [min value of range, max value of range]. For nodes 208-214, the ranges are, respectively, [0,1], [2,3], [4,5], and [6,7]. For nodes 204 and 206, the ranges are, respectively, [0,3] and [4,7]. The range for the root node 202 is [0,7]. The q-digest records the count in the nodes with a non-zero count. In FIG. 2, the solid rectangles represent nodes with a non-zero count, and the dashed rectangles represent nodes with a zero count. The q-digest therefore records the (range=r, count=c(r)) pair for nodes 220, 222, 226, 210, 212, 204, 206, and 202. Here, the total count in the q-digest 200 is N=42. Therefore, $$\left(\frac{\epsilon N}{\log W}\right) = 7.$$

In an embodiment, the sliding-window count may be calculated with a data structure including multiple instances of a q-digest data structure. Let the "right rank" of a timestamp τ, denoted by rr(τ), be defined as the number of input items whose timestamps are greater than τ. Given a window size $w \leq W$ at query time, an estimate of rr(t−w) with relative error ϵ may be calculated. An advantageous data structure may be used to approximate the sliding-window count $D_w(t)$ with relative error no more than ϵ using space $$O\left(\frac{\log W}{\epsilon} \log\left(\frac{\epsilon N}{\log W}\right)\right).$$

The time taken to update the data structure upon the arrival of a new item is $$O\left(\log\left(\frac{\epsilon N}{\log W}\right) \log \log W\right),$$

and a query for the count may be answered in time $$O\left(\log \log(\epsilon N) + \frac{\log W}{\epsilon}\right).$$

Figure 3:
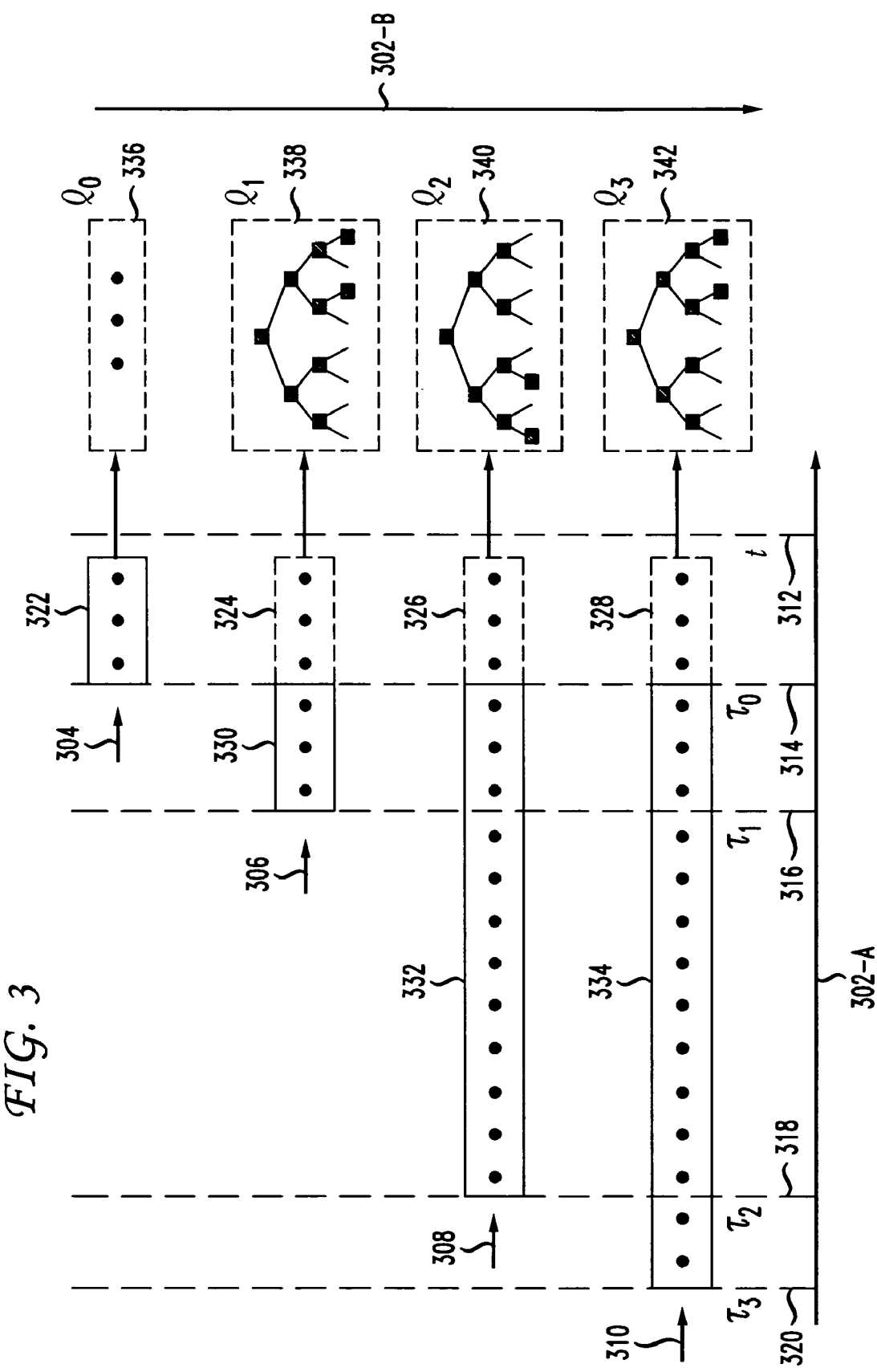
FIG. 3 shows a schematic of data capture in a sliding-windows model.

FIG. 3 shows a high-level schematic of a q-digest data structure for calculating a sliding-window count. Here, the q-digest data structure is represented by the sequence of q-digests $Q_1$ 338-$Q_3$ 342. These are discussed in further detail below. The horizontal axis 302-A and vertical axis 302-B both represent time. Horizontal axis 302-A represents the timestamps of items that arrive at a receiver. Vertical axis 302-B represents the times at which a sequence of q-digests are updated. The black dots in item sets 304-310 are generic representations of items and do not necessarily represent one item per black dot. In the figure, the intervals between items are shown as equal. In general, however, the intervals are not necessarily equal. Marker lines 312-320 indicate specific reference times. Marker line 312 indicates the query time t. Marker lines 314-320 indicate timestamps $\tau_0$-$\tau_3$, respectively. The timestamps increase in the order from $t_0$ to $t_3$.

Let $\alpha = \frac{3}{\epsilon} \log W$.

Blocks 322-328 represent the $\alpha$ items with the most recent timestamps for the item sets 304-310, respectively. Blocks 330-334 represent the remaining items in the item sets 306-310, respectively.

For item set 304, data structure $Q_0$ 336 exactly buffers the $\alpha$ items with the most recent timestamps (ties broken arbitrarily). For $j>0$, $Q_j$ is a q-digest that summarizes the most recent $2^j \alpha$ items of the data stream. Shown in the example are q-digests $Q_1$ 338-$Q_3$ 342. The square dots represent nodes, as previously discussed with respect to q-digest 200 in FIG. 2. The tree structures are shown for illustration and do not represent actual data structures. As j increases, the number of items summarized by $Q_j$ increases, but the error of estimates provided by $Q_j$ also increases. If rr(t–w) is large, using $Q_j$, where j is large, is sufficient to estimate rr(t–w), and the relative error is still small. If rr(t–w) is small, then using $Q_j$, where j is small, is sufficient to calculate the value, and the relative error is controlled.

High-level flowcharts of a process for calculating a count for a sliding-window model are shown in FIG. 4-FIG. 7. The major operations are summarized in FIG. 4. In step 402, a new arriving item is received as input to the q-digests. In step 404, the q-digests are updated. In step 406, the q-digests are examined to determine whether compression is to be applied. For example, compression may be applied after a user-specified number of arrivals. As another example, compression may be applied when the data structure has grown to a user-defined size. If compression is to be applied, then the process passes to step 408, in which the q-digests are compressed to reduce space. In step 410, the counts, which may be actual or estimates, are calculated from the q-digests. Returning to step 406, if compression is not needed, then the process passes directly to step 410. Details of processes for step 404-step 410 are discussed below.

In prior art (Shrivastava et al., ACM SenSys '04, Nov. 3-5, 2004), the upper bound on the count of a node in the q-digest (herein called the count threshold) increases with the number of items being summarized. In an embodiment, the count threshold of a node within $Q_j$ is fixed. The count threshold of $Q_j$ is set to $2^j$, and the maximum number of ranges within $Q_j$ is bounded by $\alpha$. As more items are added into $Q_j$, the number of ranges within $Q_j$ will increase beyond $\alpha$, and some ranges need to be discarded. The $\alpha$ most recent ranges within $Q_j$ are retained, and the rest are discarded. The ranges within $Q_j$ are sorted according to increasing order of right endpoints. Ties are broken by putting smaller ranges first. The $\alpha$ right-most items in this sorted order are stored in $Q_j$.

Figure 4:
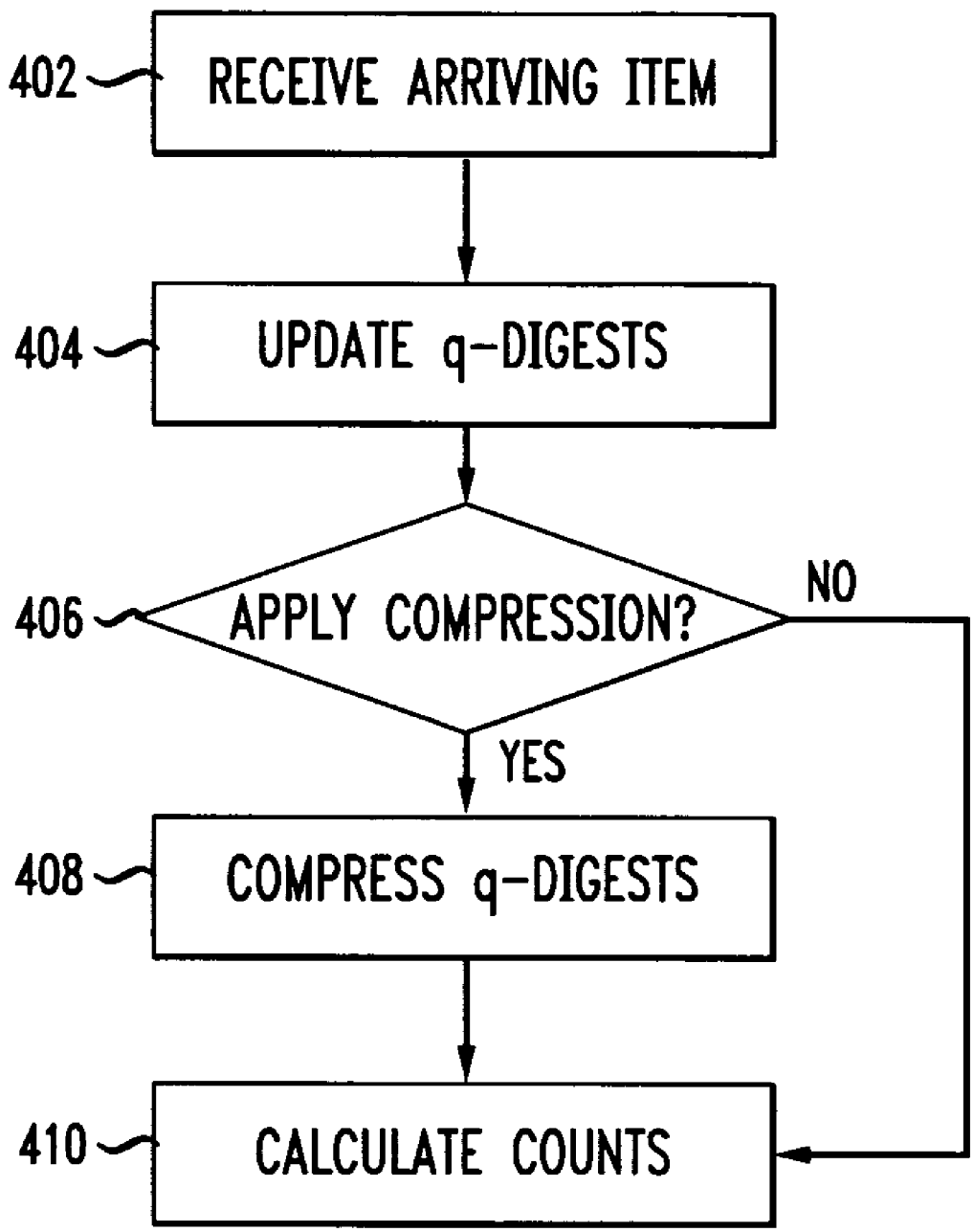
FIG. 4 shows a high-level flowchart of an overall process for calculating counts in a sliding-window model.
Figure 5:
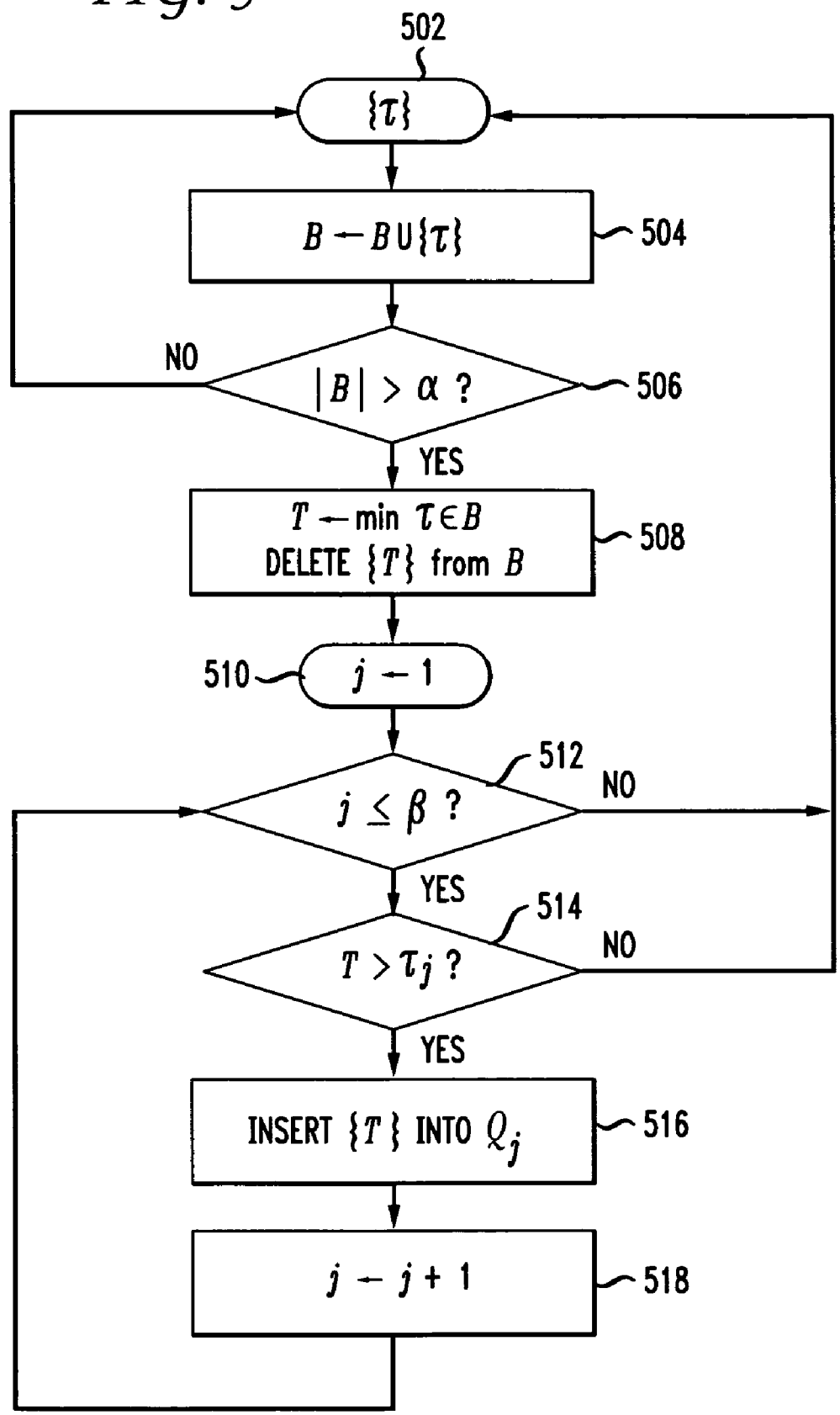
FIG. 5 shows a flowchart of a process for updating q-digests.

FIG. 5 shows a flowchart of a process, in accordance with an embodiment, for updating the q-registers (corresponding to step 404 in FIG. 4). In step 502, a new item with timestamp $\tau$ arrives at the receiver node. This item is denoted $\{\tau\}$. In step 504, the item $\{\tau\}$ is added to the buffer B, which corresponds, for example, to q-digest $Q_0$ 336 in FIG. 3. This step is represented by the operation $B \leftarrow B \cup \{\tau\}$. In step 506, the size of B, denoted |B|, is compared with the value $\alpha = \frac{3}{\epsilon} \log W,$ the maximum size of B. If B was not previously full, then in step 506, |B| is not $>\alpha$, and the process returns to step 502 to await the arrival of the next item. If B was previously full, then in step 506, |B| is $>\alpha$, and the process passes to step 508. In step 508, a parameter T is set to the minimum value of timestamp $\tau$ already present in buffer B. This step is represented by the operation $T \leftarrow \min_{\tau \in B} \tau$. The item $\{T\}$ is then deleted from buffer B. Note that $\{T\}$ is the oldest item in buffer B. That is, once B is full, the oldest item is discarded to make room for a more recent item.

The process then passes to step 510, in which the index j is initialized to 1. The index j is the index of a q-digest in the data structure. The value of j has a maximum value of $\beta = \log\left(\frac{\epsilon N}{\log W}\right).$ Step 514 and step 516 are iterated for all q-digests $Q_j$, j=[1 ... $\beta$]. In the first iteration, the process passes from step 512 to step 514, in which the value T is compared with the value $\tau_j = \tau_1$. As discussed below, the timestamp $\tau_j$ is the minimum time such that all items with timestamps greater than $\tau_j$ are properly summarized by $Q_j$. If T is $>\tau_1$, then in step 516, item $\{T\}$ is inserted into q-digest $Q_1$. In the example shown in FIG. 3, this corresponds to $Q_1$ 338. In step 514, if T is not $>\tau_1$, then the process returns to step 502 to await arrival of the next item. In step 518, the index j is incremented by 1, and the process returns to step 512. Step 514 and step 516 are then iterated for the remaining q-digests $Q_j$. In the example shown in FIG. 3, these correspond to $Q_2$ 340-$Q_3$ 342. When all the q-digests have been updated, then, in step 512, the process returns to step 502 to await arrival of the next item.

An embodiment of a process for compressing q-digests (corresponding to step 408 in FIG. 4) is described herein. For each q-digest $Q_j$, j>0, the timestamp $\tau_j$ is tracked. This value is the minimum time such that all items with timestamps greater than $\tau_j$ are properly summarized by $Q_j$. That is, $\tau_j$ is initialized to –1. Anytime a range [l, h] is discarded from $Q_j$, $\tau_j$ is set to max$\{\tau_j, h\}$. Also, $\tau_0$ is defined to be the greatest timestamp of an element discarded from $Q_0$. It is set to –1 if $Q_0$ has not discarded any item so far. For any $\tau \geq \tau_j$, rr($\tau$) can be estimated using $Q_j$ as the sum of the counts in all ranges [l, h] in $Q_j$ such that l>$\tau$. If the estimate is denoted by $\hat{rr}_j(\tau)$, then, $$\hat{rr}_j(\tau) = \sum_{(r=[l,h], c(r)), l<\tau} c(r).$$

The error in the estimate can only arise through ranges r in $Q_j$ that contain $\tau$. That is, r neither falls completely to the left or completely to the right of r in $Q_j$. Since there are at most log W ranges that contain $\tau$, the error in estimation is no more than $2^j \log W$. The following relationship then holds if $\tau \geq \tau_j$:

$rr(\tau) \leq \hat{rr}(\tau) \leq rr(\tau) + 2^j \log W.$ (E1)

If $Q_j$ is full, that is, the number of ranges within $Q_j$ is the maximum possible, then rr($\tau_j$) $\geq 3/\epsilon 2^j \log W - 2^j \log W$. Since $\epsilon < 1$, then $$rr(\tau_j) > \frac{2^{j+1}}{\epsilon} \log W. \quad (E2)$$

Figure 6:
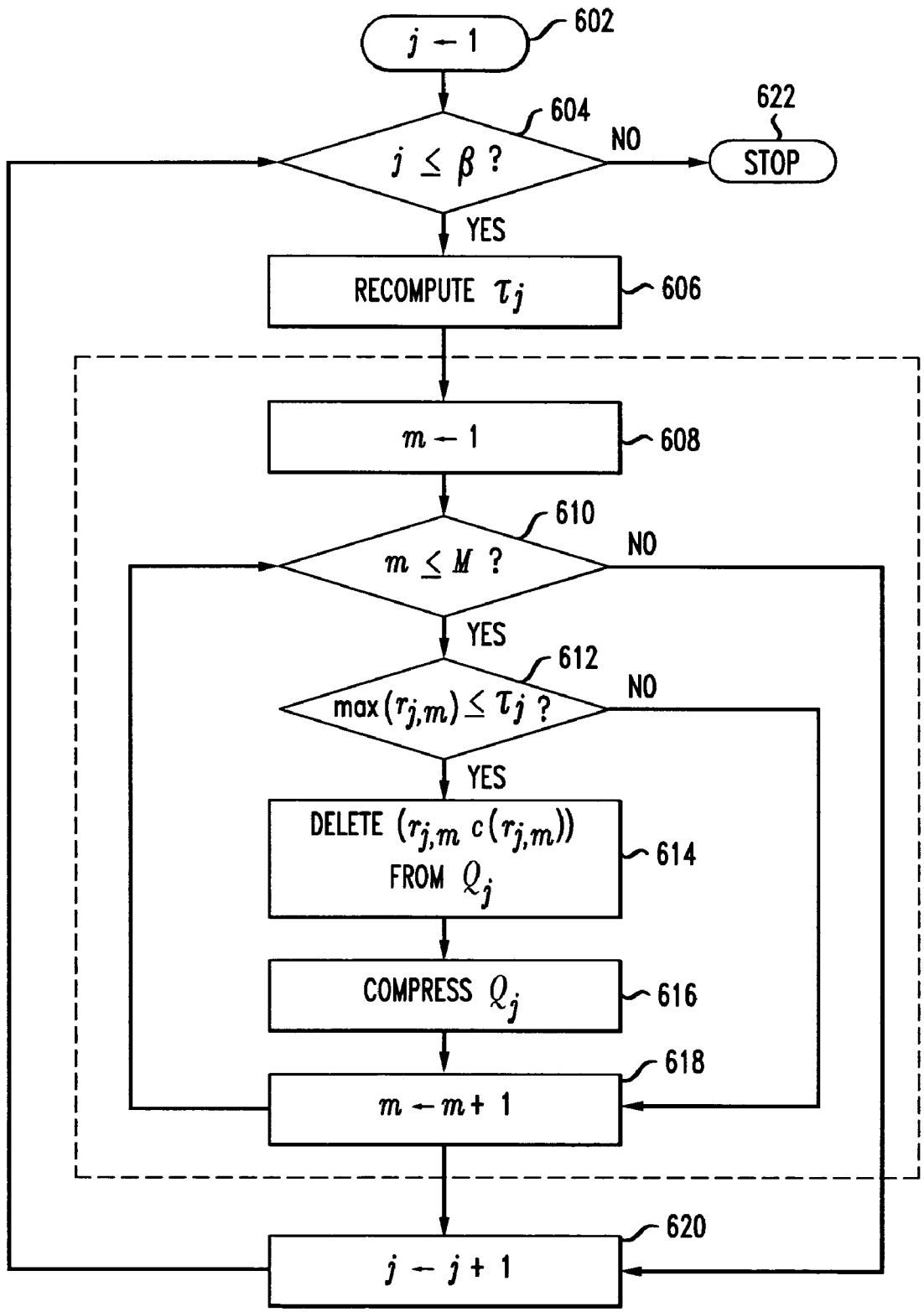
FIG. 6 shows a flowchart of a process for compressing q-digests.

FIG. 6 shows a flowchart of a process, in accordance with an embodiment, for compressing the q-digests (corresponding to step 406 in FIG. 4). In step 602, the index j is initialized to 1. In step 604, the value of j is compared with the maximum value of j, which, as discussed above, is $$\beta = \log\left(\frac{\epsilon N}{\log W}\right).$$

In the first iteration, the process passes to step 606, in which $\tau_1$ is recomputed based on the above description. The process then passes to the sub-process shown in step 608-step 618. Let m $1 \leq m \leq M$ be the index of a (range, count) pair in $Q_j$, $(r_{j,m}, c(r_{j,m})) \in Q_j$. Step 612-step 616 are then iterated for every $(r_{j,m}, c(r_{j,m})) \in Q_j$. In step 608, the index m is initialized to 1, and the process passes to step 610 in which the index m is compared to the maximum value M. In the first iteration, the process passes to step 612, in which the maximum value of $r_{l,m}$ for $(r_{l,m} c(r_{l,m})) \in Q_1$, denoted $\max(r_{l,m})$, is compared to the value of $\tau_1$. If $\max(r_{l,m})$ is $\leq \tau_1$, the process passes to step 614, in which $(r_{l,m} c(r_{l,m}))$ is deleted from $Q_1$. The process then passes to step 616, in which $Q_1$ is compressed. In step 612, if $\max(r_{l,m})$ is not $\leq \tau_1$, then the process passes directly to step 616, in which $Q_1$ is compressed. Compression methods are discussed, for example, in (Shrivastava et al., ACM SenSys '04, Nov. 3-5, 2004). In step 618, the index m is incremented by 1, and the process returns to step 610. After step 612-step 616 have been iterated for all M values of $(r_{j,m}, c(r_{j,m})) \in Q_j$, then in step 610 the process passes to step 620, in which the index j is incremented by 1. The process then returns to step 604. After step 606-step 618 have been iterated for all β values of j, then, in step 604, the process is complete, as indicated in step 622.

An embodiment of a process for calculating counts (corresponding to step 408 in FIG. 4) is described herein. Given window size w, the following steps may be used to estimate rr(t−w), that is, to calculate $\hat{rr}_l(t-w)$. Let $l \leq 0$ be the smallest integer such that $\tau_1 \leq t-w$. The accuracy guarantee can be shown as follows. If l=0, then the calculation has produced the exact answer. Otherwise, from (E1), $0 < \hat{rr}_l(t-w) - rr(t-w) \leq 2^l \log W$. Also, since $\tau_{l-1} \leq t-w$, and $Q_{l-1}$ must be full (since otherwise $\tau_{l-1}$ would be −1), then from (E2), the following holds:

$$rr(t-w) \geq rr(\tau_{l-1}) > \frac{2^l}{\epsilon} \log W. \quad (E3)$$

Thus, the relative error $$\frac{|\hat{rr}_l(t-w) - rr(t-w)|}{rr(t-w)}$$

is bounded by ε.

Figure 7:
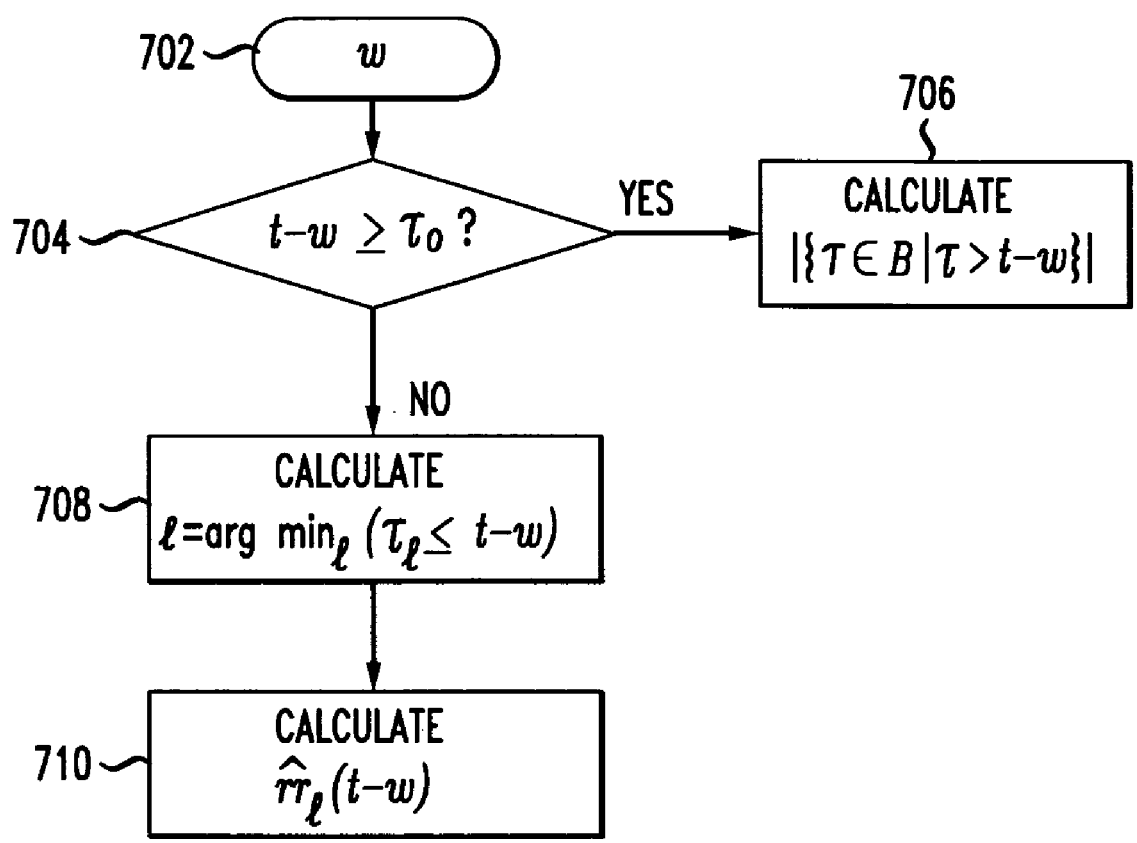
FIG. 7 shows a flowchart of a process for calculating counts.

FIG. 7 shows a flowchart of a process, in accordance with an embodiment, for calculating the count (corresponding to step 408 in FIG. 4). In step 702, the window size w is provided as input. In step 704, if $t-w \geq \tau_0$, then, as discussed above, the exact value is calculated. The process passes to step 706, in which $|\{\tau \in B | \tau > t-w\}|$ is calculated. Returning to step 704, if t−w is not $\geq \tau_0$, then the process passes to step 708. The value l is calculated, where l, as discussed above, is the smallest integer such that $\tau_l \leq t-w$. This step is represented by the operation $l = \arg\min_l(\tau_l \leq t-w)$. Then, in step 710, the estimate $\hat{rr}_l(t-w)$ is calculated.

Summarizing the overall process, in accordance with an embodiment described in the flowchart in FIG. 4, the total space required depends on the total number of q-digests used. Due to the doubling of the count threshold at each level, the largest q-digest needed is $Q_J$ for J given by $$\frac{2^J}{\epsilon} \log W \geq N,$$

yielding J=[log(εN)−log log W]. Thus the total space complexity is $$O\left(\frac{\log W}{\epsilon} \log\left(\frac{\epsilon N}{\log W}\right)\right).$$

Each new arrival requires updating, in the worst case, all J q-digests, each of which takes time O(log log W), giving a worst case time bound of $$O\left(\log\left(\frac{\epsilon N}{\log W}\right) \log\log W\right)$$

for the update. The query time is the time required to find the right $Q_l$, which can be done in time O(log J)=O(log log(εN)) (through a binary search on the $\tau_j$'s) followed by summing the counts in the appropriate buckets of $Q_l$, which can be done in time $$O\left(\frac{\log W}{\epsilon}\right)$$

for a total query time complexity of $$O\left(\log\log(\epsilon N) + \frac{\log W}{\epsilon}\right).$$

Each time the compression procedure is performed, it takes time linear in the size of the data structure. Therefore, by running compression after every $$O\left(\frac{\log W}{\epsilon}\right)$$

updates, the amortized cost of the compression is $$O\left(\log\left(\frac{\epsilon N}{\log W}\right)\right),$$

while the space bounds are as stated above.

For a sliding-window decay function, a process for calculating ranges is discussed herein. As discussed further below, other aggregates, such as quantiles and heavy-hitters, may be calculated from range calculations. Consider a stream of $(x_i, t_i)$ tuples, and let the range be denoted $r(w,x) = |\{x_1 \leq x, t - t_i \leq w\}|$. Given $(w,x)$ with $0 \leq w < W, 0 \leq x < U$, an estimate $\hat{r}(w, x)$ is calculated such that $|\hat{r}(w,x) - r(w,x)| \leq \epsilon D_w(t)$. The required approximation quality depends on $D_w(t)$, but not on the number of elements that dominate on the x coordinate. A process, in accordance with an embodiment, for calculating ranges combines the data structure for calculating approximate sliding-window counts with an extra layer of data structures for ranges. The process maintains many q-digests $Q_0, Q_1, \ldots$, each of which orders data along the time dimension. Herein, these q-digests are referred to as time-wise q-digests. Within $Q_j$, $j > 0$, the count threshold for each range is set to $2^{j-1}$. Within each range $r \in Q_j$, instead of just keeping a count of the number of elements, another q-digest is maintained. These q-digests summarize data along the value-dimension. Herein, these q-digests are referred to as value-wise q-digests.

In one embodiment, the value-wise q-digests within $Q_j$ are maintained based on a count threshold of $$\frac{2^{j-1}}{\log U}.$$

Each value-wise q-digest for a timestamp range r summarizes the value distribution of all tuples whose timestamps fall within r. Since the timestamp ranges within $Q_j$ may overlap, a single item may be present in multiple (up to log W) value-wise q-digests within $Q_j$. Similar to the process for calculating counts, $Q_j$ also maintains a threshold $\tau_j$, which is updated as in the process for calculating counts. To estimate $r(w, x)$, a process, in accordance with one embodiment, uses $Q_l$, where l is the smallest integer such that $\tau_l \leq t - w$. Within $Q_l$, there are at most log W value-wise q-digests to query based on a dyadic decomposition of the range $(t-w,t)$, and query each of these for the rank of x. Finally, the estimate $\hat{r}(w,x)$ is the sum of these results. The error of the estimate has two components. Within the time-wise q-digest $Q_l$, there is may be incurred an error of up to $2^{l-1}$ log W, since the number of elements within the timestamp range may be undercounted by up to $2^{l-1}$ log W. Also, within each value-wise q-digest, there may be incurred an error of up to $$\frac{2^{l-1}}{\log U}\log U = 2^{l-1}.$$

Since as many as log W value-wise q-digests may be used, the total error due to the value-wise q-digests is bounded by $2^{l-1}$ log W. Hence, the total error in the estimate is bounded by $2 \cdot 2^{l-1}$ log W $2^l$ log W. By choosing $$\alpha = \frac{3}{\epsilon} \log W$$

ranges within each $Q_j$, the result is $$D_w \geq rr(\tau_{l-1}) > \frac{2^l \log W}{\epsilon}.$$

Thus the error in the estimate of $r(w, x)$ is no more than $\epsilon D_w$.

The sum of counts of all nodes within all value-wise q-digests within $Q_j$ is $O(\log W\, rr(t_j))$, since each item may be included in no more than log W value-wise q-digests within $Q_j$. Consider any triple of (parent, left child, right child) ranges within a value-wise q-digest. The total count of these triples must be at least $$\frac{2^{j-1}}{\log U},$$

implying that for this many counts, a constant amount space is used. Thus, the total space taken to store $Q_j$ is $O(\log^2 W \log U/\epsilon)$. As discussed above, there are $$O\left(\log\left(\frac{\epsilon N}{\log W}\right)\right)$$

different time-wise q-digests, leading to a total space complexity of $$O\left(\frac{1}{\epsilon}\log(\epsilon N/\log W)\log^2 W \log U\right).$$

Consider the time to update each $Q_j$. This requires the insertion of the item into no more than log W value-wise q-digests. Each such insertion takes time $O(\log \log U)$, and the total time to insert into all $Q_j$'s is $$O\left(\log\left(\frac{\epsilon N}{\log W}\right)\log W(\log\log U)\right) = O(\log(\epsilon N)\log W(\log\log U)).$$

In another embodiment, ranges are calculated using time-wise q-digests $Q_j$, each node of which contains a value-wise q-digest. Here, there are the same number and arrangement of time-wise q-digests. Instead of inserting each update in all value-wise q-digests that summarize time ranges in which it falls, it is inserted in only one, corresponding to the node in the time-wise structure whose count is incremented due to insertion. The pruning condition for the value-wise q-digest is based on $\epsilon n/2\log U$, where $n = c(r)$ is the number of items counted by the time-wise q-digest in the range. Each value-wise q-digest is a q-digest which summarizes the values inserted into it, and so takes space $$O\left(\frac{\log U}{\epsilon}\right).$$

To calculate values of $r(w, q)$, the value r, based on $\tau_l$ and query $Q_j$ is calculated. There may be incurred an error $2^{l-1}$ log W from uncertainty in $Q_l$. All value-wise summaries within $Q_l$ which correspond to items arriving within the time window $(t-w,t)$ are merged together, at query time. The value of x is calculated from the resulting q-digest. By the properties of merging q-digests, the error in this calculation is bounded by $\epsilon/2\, D_w$. Summing these two components gives the total error bound of $\epsilon D_w$.

The space required is calculated by taking the number of value-wise q-digests for each $$Q_j, O\left(\frac{\log W}{\epsilon}\right)$$

and multiplying by the size of each, $$O\left(\frac{\log U}{\epsilon}\right),$$

over the $J=\log(\epsilon N)-\log\log W$ levels. The overall bound is $$O\left(\frac{1}{\epsilon^2}\log U \log W \log\left(\frac{\epsilon N}{\log W}\right)\right).$$

The amortized cost of compression can be made $O(1)$. The overall amortized cost per update is therefore $$O\left(\log\left(\frac{\epsilon N}{\log W}\right)(\log\log W + \log\log U)\right).$$

Sliding-window range calculations can be approximated in space $$O\left(\frac{1}{\epsilon}\log U \log W \log\left(\frac{\epsilon N}{\log W}\right)\min\left(\log W, \frac{1}{\epsilon}\right)\right)$$

and time $$O\left(\log\left(\frac{\epsilon N}{\log W}\right)\log W \log\log U\right)$$

per update. Queries take time linear in the space used.

Calculating quantiles and heavy hitters are discussed herein. Calculating values of heavy hitters and quantiles in a sliding window may be reduced to calculating values of ranges. Approximate answers to range calculations yield good approximations for quantiles and heavy hitters. For a maximum window size W, a data structure for range calculations with accuracy parameter $\epsilon/2$ is created. To calculate an approximate $\phi$-quantile, an approximation $\hat{D}_w$ of $D_w$ is calculated using the time-wise q-digests. A binary search is then made for the smallest x such that $\hat{r}(w, x)\leq\phi\hat{D}_w$. Such an x satisfies the requirements for being an approximate $\phi$-quantile:

$$|\hat{D}_w - D_w| \leq \frac{\epsilon}{2}D_w,$$

and $$|\hat{r}(w, x) - r(w, x)| \leq \frac{\epsilon}{2}D_w.$$

Values of $\phi$-heavy hitters may be calculated by calculating $\phi'$-quantiles, for $\phi'=\epsilon, 2\epsilon, 3\epsilon \ldots 1$. All items that repeatedly occur as $\phi/\epsilon$ (or more) consecutive quantiles are reported. If any item has frequency at least $(\phi+\epsilon)D_w$, it will surely be reported. Also, any item which has frequency less than $(\phi-\epsilon)D_w$ will surely not be reported.

Calculating sliding-window quantile and heavy hitters with out-of-order arrivals may be made in the same bounds as calculating sliding-window ranges, as discussed above. This lets window size w<W to be specified at query time. If the window size is fixed to W tuples and only the q-digest for the appropriate $\tau_j$ is kept, a factor of $$O\left(\log\left(\frac{\epsilon N}{\log W}\right)\right)$$

is saved.

An embodiment for calculating quantiles and heavy hitters for an exponential decay function is discussed herein. Given an arrival of item $<x_i, t_i>$, a summary of the exponentially decayed data may be generated. Let t' be the last time the data structure was updated. Every count in the data structure is multiplied by the scalar $\exp(-\lambda(t-t'))$ so that it reflects the current decayed weights of all items. The q-digest is then updated with the item $x_i$ with weight $\exp(-\lambda(t-t'))$. In an advantageous embodiment, the current decayed count D is tracked exactly, and a timestamp $t_r$ is kept on each counter $c(r)$ denoting the last time it was updated. Whenever the current value of range r is required, it may be multiplied by $\exp(-\lambda(t-t_r))$, and $t_r$ is updated to t. This ensures that the asymptotic space and time costs of maintaining an exponentially decayed q-digest remains the same as before.

The process may be verified as follows. Let $S(r)$ denote the subset of input items which the procedure is representing by the range r. When the procedure processes a new update $<x_i, t_i>$ and updates a range r, then set $S(r)=S(r)\cup i$. When the procedure merges a range r' together into range r by adding the count of (the child range) r' into the count of r (the parent), then set $S(r)=S(r)\cup S(r')$, and $S(r')=\emptyset$ (since r' has given up its contents). The procedure maintains the property that $$c(r) = \sum_{i \in S(r)} \exp(-\lambda(t - t_i)).$$

Every operation which modifies the counts (for example, adding a new item, merging two range counts, or applying the decay functions) maintains this invariant. Every item summarized in $S(r)$ is a member of the range, that is, $i\in S(r)\rightarrow x_i\in r$, and at any time each tuple from the input is represented in $S(r)$ is a member of the range r, that is, $i \in S(r)\rightarrow x_i \in r$, and, at any time, each tuple i from the input is represented in exactly one range r.

To estimate $$r_\lambda(x) = \sum_{i, x_i \leq x} \exp(\lambda(t - t_i)),$$

the following value is computed:

$$\hat{r} = \sum_{r=[l\ldots h], h \leq x} c(r).$$

By the above analysis of c(r), all items that are surely less than x are included, and all items that are surely greater than x are omitted. The uncertainty depends only on the ranges containing x, and the sum of these ranges is at most $$\epsilon \sum_r c(r) = \epsilon D.$$

Values of decayed rank may be calculated deterministically, with bounded approximation error. A $\phi$-quantile with the desired error bounds may be found by binary searching for x whose approximate rank is $\phi$ D. Under a fixed exponential decay function $\exp(-\lambda(t-t_i))$, the following resources are required for specific operations: decayed quantile queries in space $$O\left(\frac{1}{\epsilon} \log U\right)$$

and time per date O(log log U). Queries take time $$O\left(\frac{\log U}{\epsilon}\right).$$

Figure 8:
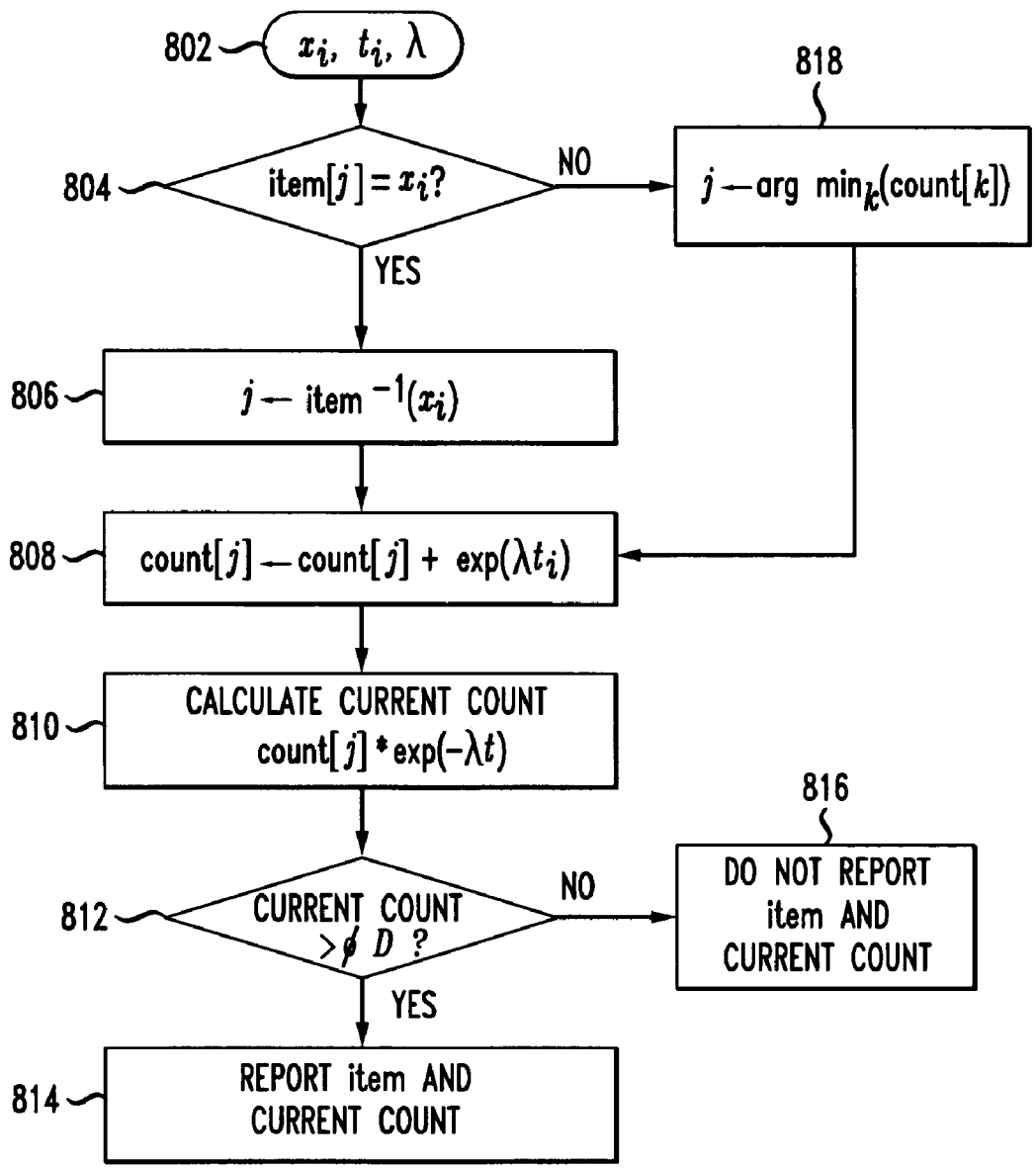
FIG. 8 shows a flowchart for calculating heavy hitters in an exponential-decay model; and, FIG. 9 shows a schematic of a computer for computing time-decayed aggregates in out-of-order data streams.

In an embodiment, a data structure may be used to calculate heavy hitters under an exponential decay function, since the data structure guarantees an error of at most $\epsilon$D in the count of any single item. The data structure may be scanned to find and estimate all possible heavy hitters in time linear in the size of the data structure. A set of O(1/$\epsilon$) pairs of item names and counters, with the counters initialized to zero, are tracked. FIG. 8 shows a flowchart for a process, in accordance with an embodiment, for calculating heavy hitters. In step 802, the input values of item identifier $x_i$, timestamp $t_i$, and decay parameters $\lambda$ are received. In step 804, the data structure is checked to determine whether it already contains an (item, counter) pair for item $\{x_i\}$. If there is, the process then passes to step 806, in which the index j is set to index i. This step is represented by the operation j←item$^{-1}$ ($x_i$). The process then passes to step 808, in which the decayed count $\exp(\lambda t_i)$ is added to the counter for $\{x_i\}$. This step is represented by the operation count[j]←count[j]+$\exp(\lambda t_i)$. In step 804, if the data structure does not already contain an (item, counter) pair for item $\{x_i\}$, then the process passes to step 818, in which the index j is set to the value associated with the item with the lowest count (breaking ties arbitrarily). This step is represented by the operation j←arg min$_k$(count[k]). The process then passes to step 808, in which, as before, the decayed count $\exp(\lambda t_i)$ is added to the counter for $\{x_i\}$. The process then passes to step 810, in which the current count is calculated by multiplying count[j] by the time decay factor $\exp(-\lambda t)$, where t is the current time. The process then passes to step 812, in which the current count is compared with the threshold value $\phi$D, specified for a heavy hitter. If the current count does exceed the threshold value, the process passes to step 814, and the item and its current count are reported. In step 812, if the current count does not exceed the threshold value, the process passes to step 816, and the item and its associated count are not reported. The $\epsilon$-approximate exponentially decayed heavy hitters are found in space O(1/$\epsilon$) and updated in time $$O\left(\log\left(\frac{1}{\epsilon}\right)\right).$$

An embodiment is discussed herein for a process in which an arbitrary decay function is approximated by multiple sliding windows. Consider an arbitrary decay function g(a) and the heavy hitters aggregate. The decayed count of any item x may be represented as the sum $$g(0)f_x(0) + \sum_{j=1}^{t} (g(j) - g(j-1))f_x(j),$$

where $f_x(i)$ denotes the count of item x in the window of size j. The approximate heavy hitters may be calculated by calculating the approximate counts of each item in each window up to t. Because the count of x in window j is approximated with error $\epsilon D_j$, summing all counts gives the error:

$$\sum_{j=1}^{t} g(t-j) - g(t-j+1)\epsilon D_j = \epsilon D.$$

The speed of the process may be increased by making appropriate use of the contents of the data structure. It is not necessary to enumerate every possible item x. The information on which items are stored in the sliding-window data structure may be used, since items not stored are guaranteed not to be significant under the decay function. In addition, it is not necessary to query all possible time values. Again, the data structure only stores information about a limited number of timestamps, and queries about sliding windows with other timestamps will give the same answers as queries on some timestamp stored in the data structure. Thus, the sum only at timestamps stored in the data structure need to be evaluated, rather than at all possible timestamps. For quantiles, the results are similar. Instead of computing the decayed count of an item, the decayed rank of items is computed, and a binary search is conducted to find the desired quantile. The same space bounds hold. The process is advantageous. It handles item arrivals in completely arbitrary orders. It handles any arbitrary decay function efficiently, and the decay function may be specified at query time, after the input stream has been seen. All these results hold deterministically. Decayed heavy hitter and quantile queries on out-of-order arrivals may be answered within the bounds previously stated for sliding-window range queries. They may be approximated in space $$O\left(\frac{1}{\epsilon} \log U \log W \log\left(\frac{\epsilon N}{\log W}\right) \min\left(\log W, \frac{1}{\epsilon}\right)\right)$$

and time $$O\left(\log\left(\frac{\epsilon N}{\log W}\right)\log W \log\log U\right)$$

per update. Queries take time linear in the space used.

Figure 9:
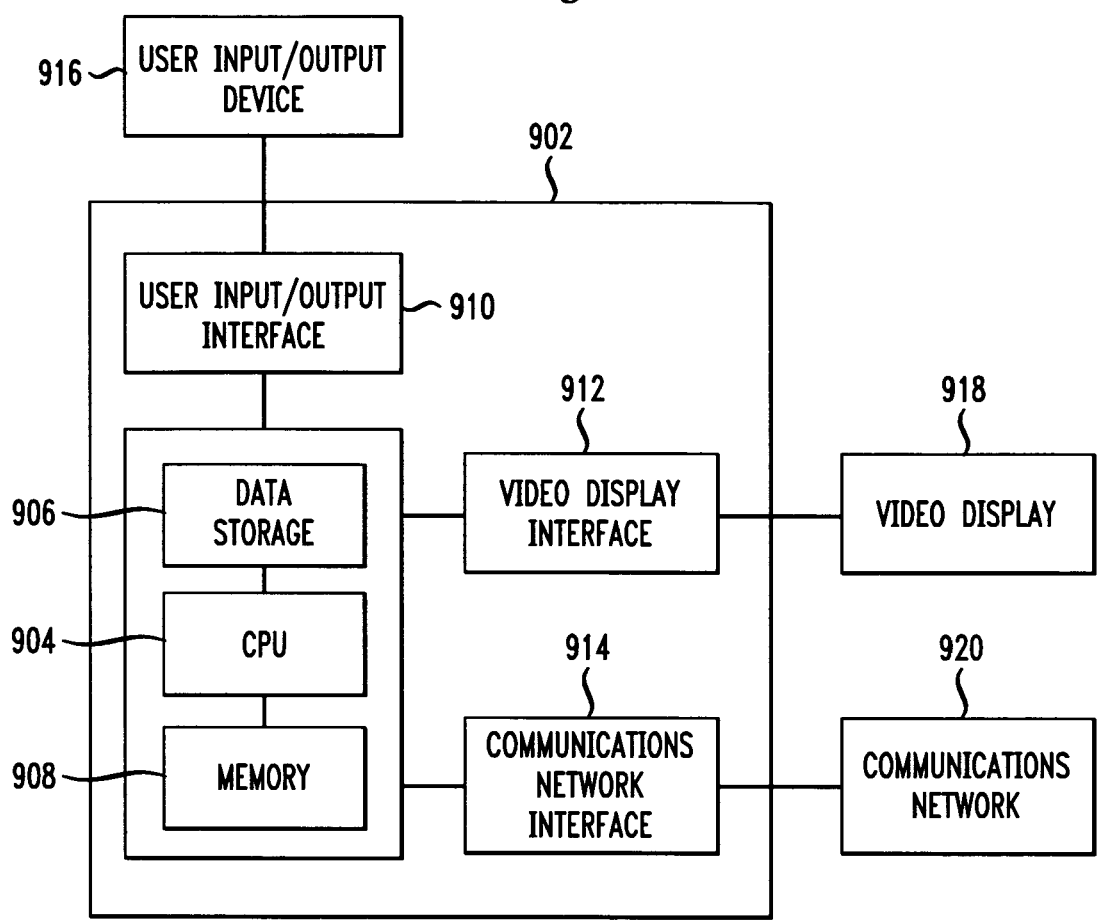

One embodiment of a data processor for computing time-decayed aggregates in out-of-order data streams may be implemented using a computer. For example, the steps shown in the flowcharts in FIG. 4-FIG. 8 may be implemented using a computer. As shown in FIG. 9, computer 902 may be any type of well-known computer comprising a central processing unit (CPU) 904, memory 908, data storage 906, and user input/output interface 910. Data storage 906 may comprise a hard drive or non-volatile memory. User input/output interface 910 may comprise a connection to a user input device 916, such as a keyboard or mouse. As is well known, a computer operates under control of computer software which defines the overall operation of the computer and applications. CPU 904 controls the overall operation of the computer and applications by executing computer program instructions which define the overall operation and applications. The computer program instructions may be stored in data storage 906 and loaded into memory 908 when execution of the program instructions is desired. Computer 902 may further comprise a video display interface 912, which may transform signals from CPU 904 to signals which may drive video display 918. Computer 902 may further comprise one or more network interfaces. For example, communications network interface 914 may comprise a connection to an Internet Protocol (IP) communications network 920, which may transport user traffic. For example, communications network interface 914 may connect to data receiver DR0 122 in FIG. 1. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for calculating a time-decayed aggregate from a data stream comprising a sequence of tuples, each tuple comprising an item identifier and an associated timestamp, comprising the steps of:
generating a time-dependent weighted sequence of tuples by multiplying with a processor each of said sequence of tuples by a time-dependent weighting factor calculated from a decay function, wherein said decay function is a function of the timestamp associated with the tuple and a current time;
generating a quantile-digest data structure from said time-dependent weighted sequence of tuples;
updating said quantile-digest data structure with said time-dependent weighted sequence of tuples; and,
calculating said time-decayed aggregate from the updated quantile-digest data structure.

2. The method of claim 1 wherein said quantile-digest data structure comprises a set of quantile-digests.

3. The method of claim 1 further comprising the step of compressing said quantile-digest data structure.

4. The method of claim 1 wherein said decay function is a sliding-window function.

5. The method of claim 1 wherein said decay function is an exponential decay function.

6. The method of claim 1 wherein said decay function is a polynomial decay function.

7. The method of claim 1 wherein said time-decayed aggregate is a time-decayed user-defined aggregate function.

8. The method of claim 1 wherein said time-decayed aggregate is a time-decayed count.

9. The method of claim 1 wherein said time-decayed aggregate is a time-decayed range.

10. The method of claim 1 wherein said time-decayed aggregate is a time-decayed quantile.

11. The method of claim 1 wherein said time-decayed aggregate is a time-decayed heavy hitter.

12. An apparatus for calculating a time-decayed aggregate from a data stream comprising a sequence of tuples, each tuple comprising an item identifier and an associated timestamp, comprising:
means for generating a time-dependent weighted sequence of tuples by multiplying each of said sequence of tuples by a time-dependent weighting factor calculated from a decay function, wherein said decay function is a function of the timestamp associated with the tuple and a current time;
means for generating a quantile-digest data structure from said time-dependent weighted sequence of tuples;
means for updating said quantile-digest data structure with said time-dependent weighted sequence of tuples; and,
means for calculating said time-decayed aggregate from the updated quantile-digest data structure.

13. The apparatus of claim 12, further comprising means for generating a set of quantile-digests.

14. The apparatus of claim 12, further comprising means for compressing said quantile-digest data structure.

15. The apparatus of claim 12, further comprising means for calculating a time-decayed user-defined aggregate function.

16. The apparatus of claim 12, further comprising means for calculating a time-decayed count.

17. The apparatus of claim 12, further comprising means for calculating a time-decayed range.

18. The apparatus of claim 12, further comprising means for calculating a time-decayed quantile.

19. The apparatus of claim 12, further comprising means for calculating a heavy hitter.

20. A non-transitory computer readable medium storing computer program instructions for calculating a time-decayed aggregate from a data stream comprising a sequence of tuples, each tuple comprising an item identifier and an associated timestamp, the computer program instructions defining the steps of:
generating a time-dependent weighted sequence of tuples by multiplying each of said sequence of tuples by a time-dependent weighting factor calculated from a decay function, wherein said decay function is a function of the timestamp associated with the tuple and a current time;
generating a quantile-digest data structure from said time-dependent weighted sequence of tuples;
updating said quantile-digest data structure with said time-dependent weighted sequence of tuples; and, calculating said time-decayed aggregate from the updated quantile-digest data structure.

21. The non-transitory computer readable medium of claim 20 wherein said computer program instructions defining the step of generating a quantile-digest data structure further comprise computer program instructions defining the step of:
    generating a set of quantile-digests.

22. The non-transitory computer readable medium of claim 20 wherein said computer program instructions further comprise computer program instructions defining the step of:
    compressing said quantile-digest data structure.

23. The non-transitory computer readable medium of claim 20 wherein said computer program instructions defining the step of calculating a time-decayed aggregate further comprise computer instructions defining the step of:
    calculating a time-decayed user-defined aggregate function.

24. The non-transitory computer readable medium of claim 20 wherein said computer program instructions defining the step of calculating a time-decayed aggregate further comprise computer instructions defining the step of:
    calculating a time-decayed quantile.

25. The non-transitory computer readable medium of claim 20 wherein said computer program instructions defining the step of calculating a time-decayed aggregate further comprise computer instructions defining the step of:
    calculating a time-decayed heavy hitter.

* * * * *